Feb. 4, 1958        D. ARCABOSSO        2,821,904

SELF-OPERATED INTERIOR BASTER FOR FOOD OBJECTS

Filed April 18, 1955

INVENTOR.
DOMENICO ARCABOSSO
BY R. W. Hodgson
Agent

United States Patent Office 2,821,904
Patented Feb. 4, 1958

2,821,904

SELF-OPERATED INTERIOR BASTER FOR FOOD OBJECTS

Domenico Arcabosso, St. Louis, Mo.

Application April 18, 1955, Serial No. 501,900

4 Claims. (Cl. 99—346)

Generally speaking, the present invention relates to the cooking art, and, more particularly, it relates to roasting apparatus cooperable with a food object to be roasted to facilitate interior basting of said food object during a roasting operation, so designed as to virtually eliminate the need for hand basting of food objects requiring such basting and which, in the present specifically illustrated form consists of one (or more) hollow apertured penetration means including an apertured penetration end and an apertured exterior end; said apertured penetration end being cooperable for insertion into the interior of a food object (such as a fowl or a roast or the like) to be roasted, with the apertured exterior end positioned exterior of said food object, thereby effectively communicating the interior and the exterior of said food object to facilitate interior basting of said food object.

While applicant is aware of the fact that a very considerable number of self-operated basters have been developed in the past, most of these included only exterior basting of the food object.

It is further true that other self-operated basters have been an integral part of a specific roasting pan, or the like, and were, therefore, not cooperable for use with varying sizes of food objects or in different containers.

It is still further true that most previous basting devices have required manual periodic insertion of the basting liquids.

The present invention is so constructed that basting of any food object (such as roasts, fowl, etc.) is usually done entirely automatically, and completely and thoroughly bastes the interior of said food object.

Generally speaking, the present invention may include: at least one (usually two) hollow apertured penetration means comprising basting liquid inlet means and including a hollow apertured penetration end and an apertured base end in communication with the penetration end; said apertured penetration end (which may comprise a plurality of apertures) being cooperable for insertion (usually upwardly) into the interior of a food object (such as a roast, fowl, or the like) to be roasted (or baked), with the apertured exterior end positioned exterior of said food object, thereby effectively communicating the interior and the exterior of said food object to facilitate interior basting of said food object. In some specific instances (such as when roasting or baking a fowl), another hollow apertured penetration means may be used, comprising basting liquid outlet means and including a hollow apertured penetration end and an apertured exterior return-flow end in communication therewith, and which effectively cooperates through the medium of said food object with the first hollow apertured penetration means, said apertured penetration end being cooperable for insertion (usually laterally) into the interior of a food object with the apertured return-flow end positioned exterior thereof for effective basting-liquid-flow cooperation with respect to the basting liquid inlet means and the interior of said food object.

From the above description of basic and preferred generic forms of the present invention, it will be apparent to those skilled in the art that virtually all of the prior art disadvantages are virtually entirely eliminated and overcome in and through the use of the present invention.

For example, it is obvious that the advantages of the present invention permit complete and thorough interior basting of a food object in and through said food object.

It is further obvious that being a separate component and not an integral part of any cooking or baking pan or vessel, it is entirely cooperable for use with varying sizes of food objects in varying sizes and shapes of containers.

For further example, it is obvious that the present invention does not (in the normal and preferred usage) require laborious, repeated manual basting, or insertion of the basting liquids.

With the above points in mind, it is an object of the present invention to provide apparatus for self-operated interior basting of food objects during a roasting operation, said apparatus being of cheap, simple, novel, easy-to-operate and easy-to-maintain construction capable of interiorly basting oven-roasted food objects (such as a roast, ham, fowl, or the like).

Other and allied objects will become apparent to those skilled in the art after a careful perusal, examination, and study of the accompanying illustrations, the present specification and the appended claims.

To facilitate understanding, reference will be made to the hereinbelow described drawings, in which.

Figure 7:
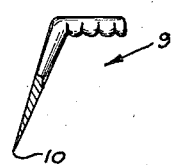
Figure 8:
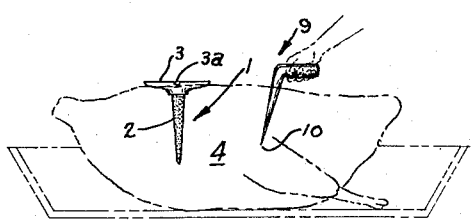

Fig. 7 illustrates a sharp metal (usually aluminum) punch which may be used to facilitate insertion of the penetration means of Figs. 1–5; and Fig. 8 is a view of (a) the fowl in preparatory position with the first (inlet) penetration means already having been inserted and the punch means (illustrated in Fig. 7) being used to prepare for the insertion of the second inlet penetration means, and (b) an optional secondary basting position wherein the fowl has been turned on its back with the base of the inlet penetration means pointing upward to permit the manual filling of the inlet penetration means with the basting liquid.

Generally speaking, the present invention may include: at least one (usually two) hollow apertured penetration means comprising basting liquid inlet means and including a hollow apertured penetration end and an apertured base end in communication with the penetration end; said apertured penetration end (which may comprise a plurality of apertures) being cooperable for insertion (usually upwardly) into the interior of a food object (such as a roast, fowl, or the like) to be roasted (or baked), with the apertured exterior end positioned exterior of said food object, thereby effectively communicating the interior and the exterior of said food object to facilitate interior basting of said food object. In some specific instances (such as when roasting or baking a fowl), another hollow apertured penetration means may be used, comprising basting liquid outlet means and including a hollow apertured penetration end and an apertured exterior return-flow end in communication therewith, and which effectively cooperates through the medium of said food object with the first hollow apertured penetration means, said apertured penetration end being cooperable for insertion (usually laterally) into the interior of a food object with the apertured return-flow end positioned exterior thereof for effective basting-liquid-flow cooperation with respect to the basting liquid inlet means and the interior of said food object.

In one preferred form of the present invention, said hollow apertured inlet penetration means, indicated generally at 1, may include a plurality of hollow apertured penetration means each comprising (as specifically illustrated in Figs. 1, 2, 3, 6 and 8) self-basting inlet means and each including a hollow, virtually conical, multiply apertured penetration end 2 and a domed hollow base end 3 (laterally apertured at 3a) in communication with the penetration end 2 and positioned in virtually perpendicular relationship with respect to the penetration end 2. Each of said apertured penetration ends 2 is cooperable for insertion into the hollow interior of a food object (such as the fowl 4) with the corresponding apertured base ends 3 positioned exterior of and underneath said fowl 4 (as illustrated in Fig. 6) for automatic reception of basting liquid 5 as a result of the boiling thereof during the roasting operation.

Figure 1:
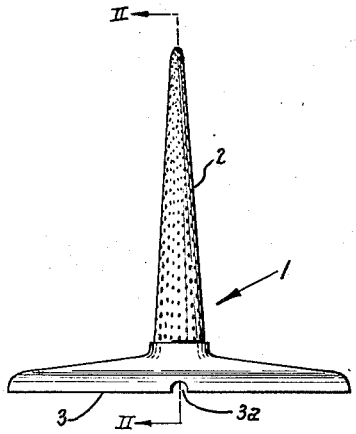
Fig. 1 is a side elevational view of the first (inlet) penetration means of one embodiment of the present invention.
Figure 2:
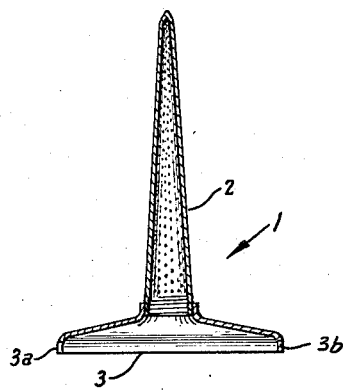
Fig. 2 is a vertical sectional view of the device shown in Fig. 1, as indicated by the arrows II—II in Fig. 1.
Figure 3:
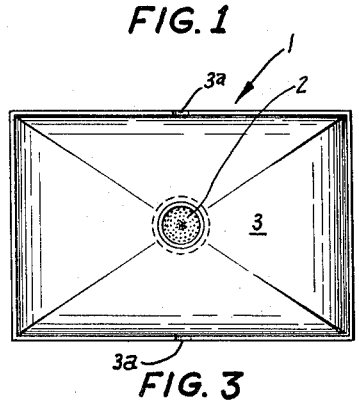
Fig. 3 is a top plan view of the device shown in Figs. 1 and 2.
Figure 4:
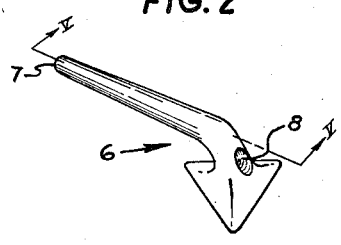
Fig. 4 is a perspective view of the second (outlet) penetration means.
Figure 5:
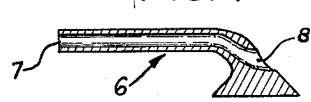
Fig. 5 is a cross-sectional view of the device shown in Fig. 4, as indicated by the arrows V—V in Fig. 4.
Figure 6:
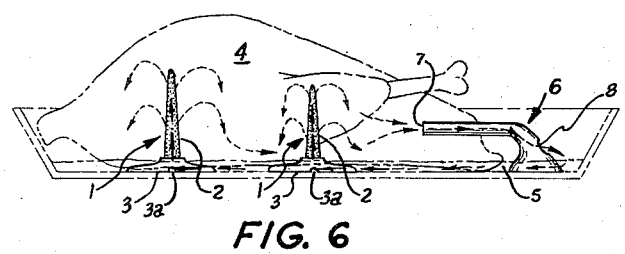
Fig. 6 is a side operational view showing two of the inlet penetration devices (of different size) of the type shown in Figs. 1–3, and the outlet penetration means shown in Figs. 4 and 5 in operational position in the hollow interior of a fowl in a roasting pan (both indicated by broken-line drawing)—this view includes directional arrows showing the direction of flow of the basting liquid.

Another preferred form of the present invention may also include an outlet hollow apertured penetration means, indicated generally at 6, comprising basting liquid outlet means, and including a hollow apertured penetration end 7 and an apertured exterior return-flow end 8 in communication therewith, said apertured penetration end 7 being cooperable for insertion into the hollow interior of a fowl 4 with the apertured return-flow end 8 positioned exterior thereof and laterally adjacent said fowl 4 for the automatic return of basting liquid 5 from the hollow interior of the fowl 4 to the apertured base end 3 of the self-basting inlet means 1 whereby to provide continuous effectively circulating self-basting of the interior of the fowl 4 during the roasting operation (as illustrated by the directional arrows in Fig. 6).

One other preferred form of the present invention (as specifically illustrated in Fig. 8) may eliminate the use of the outlet penetration means 6 and permit the insertion of the inlet penetration means 1 from the exterior, upper side of the fowl 4 to permit manual filling of the inlet penetration end 2 with basting liquid (such position is illustrated in Fig. 8).

In one of the preferred forms of the present invention, a punch 9 may be included, said punch having a sharpened end 10 to be used to facilitate insertion of the inlet penetration means 1 and the outlet penetration means 6 (as illustrated in Fig. 8).

Numerous modifications and variations of the present invention will occur to those skilled in the art after a careful study hereof. All such, properly within the basic scope and/or teachings of the present invention are intended to be included and comprehended herein as fully as if specifically described, illustrated and claimed herein.

For example, the inlet penetration means may take any of a variety of shapes and may include any of a variety of apertures to permit the flow of the basting liquid. The same is true of the outlet penetration means in that the form specifically illustrated in Figs. 4–6 may take any of a variety of shapes, and both penetration means may be made of a variety of materials and/or metals.

The exact compositions, configurations, relative positionings and cooperative relationships of the various components parts of the present invention are not critical, and may be modified substantially within the basic teachings, spirit and scope of the present invention.

The embodiment of the present invention specifically described, illustrated and claimed herein is exemplary only, and is not intended to limit the scope of the present invention, which is intended to be interpreted in the light of the prior art and the appended claims only, with due consideration for the doctrine of equivalents.

I claim:

1. Fowl roasting apparatus cooperable with a fowl having a hollow interior for providing self-operated interior basting of said fowl during a roasting operation, comprising: a roasting pan having a substantially flat bottom and upstanding sidewall means; at least one hollow apertured penetration means comprising self-basting inlet means and including a hollow conical penetration end having virtually its entire surface provided with a plurality of longitudinally and circumferentially spaced apertures and a hollow domed laterally apertured base end integral with and in communication with the hollow interior of said penetration end and positioned in virtually perpendicular relationship with respect to said penetration end at the bottom thereof, said continuously multi-apertured penetration end being cooperable for insertion upwardly into the hollow interior of a fowl with the domed laterally apertured base end positioned exterior of and underneath said fowl resting upon the substantially flat bottom of said roasting pan for automatic reception of basting liquid carried by the bottom of said roasting pan as a result of the boiling thereof during the roasting operation; and another hollow apertured penetration means comprising lateral self-basting liquid outlet means and including a lateral hollow apertured penetration end and an apertured exterior return-flow end in communication therewith, said apertured penetration end being cooperable for lateral insertion into the hollow interior of a fowl in interior direct communication with the multi-apertured penetration end of said self-basting inlet means, and with the apertured return-flow end resting upon said substantially flat bottom of said roasting pan exterior of said fowl and laterally adjacent thereto for the automatic return of basting liquid from the hollow interior of the fowl to the hollow domed laterally apertured base end of the self-basting inlet means by means of the return-flow path provided by said underlying substantially flat bottom of said roasting pan, whereby to provide continuous effectively circulating self-basting of the interior of the fowl during the roasting operation.

2. Fowl roasting apparatus cooperable with a fowl having a hollow interior for providing self-operated interior basting of said fowl during a roasting operation, comprising: a roasting pan having a substantially flat bottom and upstanding sidewall means; a plurality of hollow apertured penetration means comprising self-basting inlet means and each including a hollow conical penetration end having virtually its entire surface provided with a plurality of longitudinally and circumferentially spaced apertures and a hollow domed laterally apertured base end integral with and in communication with the hollow interior of said penetration end and positioned in virtually perpendicular relationship with respect to the penetration end at the bottom thereof, each of said continuously multi-apertured penetration ends being cooperable for insertion upwardly into the hollow interior of a fowl at laterally spaced points, with the corresponding domed laterally apertured base ends positioned exterior of and underneath said fowl resting upon the substantially flat bottom of said roasting pan for automatic reception of basting liquid carried by the bottom of said roasting pan as a result of the boiling thereof during the roasting operation; and another hollow apertured penetration means comprising lateral self-basting liquid outlet means and including a lateral hollow apertured penetration end and an apertured exterior return-flow end in communication therewith, said apertured penetration end being cooperable for lateral insertion into the hollow interior of a fowl in interior direct communication with the plurality of multi-apertured penetration ends of said plurality of self-basting inlet means, and with the apertured return-flow end resting upon said substantially flat bottom of said roasting pan exterior of said fowl and laterally adjacent thereto for the automatic return of basting liquid from the hollow interior of the fowl to the hollow domed laterally apertured base ends of the plurality of self-basting inlet means by means of the return-flow path provided by said underlying substantially flat bottom of said roasting pan, whereby to provide continuous effectively circulating self-basting of the interior of the fowl during the roasting operation.

3. Fowl roasting apparatus cooperable with a fowl having a hollow interior for providing self-operated interior basting of said fowl during a roasting operation, comprising: at least one hollow apertured penetration means comprising self-basting inlet means and including a hollow conical penetration end having virtually its entire surface provided with a plurality of longitudinally and circumferentially spaced apertures and a hollow domed laterally apertured base end integral with and in communication with the hollow interior of said penetration end and positioned in virtually perpendicular relationship with respect to said penetration end at the bottom thereof, said continuously multi-apertured penetration end being cooperable for insertion upwardly into the hollow interior of a fowl with the domed laterally apertured base end positioned exterior of and underneath said fowl for automatic reception of basting liquid carried by an underlying roasting pan as a result of the boiling thereof during the roasting operation; and another hollow apertured penetration means comprising lateral self-basting liquid outlet means and including a lateral hollow apertured penetration end and an apertured exterior return-flow end in communication therewith, said apertured penetration end being cooperable for lateral insertion into the hollow interior of a fowl in interior direct communication with the multi-apertured penetration end of said self basting inlet means, and with the apertured return-flow end positioned exterior of said fowl and laterally adjacent thereto for the automatic return of basting liquid from the hollow interior of the fowl to the hollow domed laterally apertured base end of the self-basting inlet means by means of an underlying roasting pan whereby to provide continuous effectively circulating self-basting of the interior of the fowl during the roasting operation.

4. Fowl roasting apparatus cooperable with a fowl having a hollow interior for providing self-operated interior basting of said fowl during a roasting operation, comprising: a plurality of hollow apertured penetration means comprising self-basting inlet means and each including a hollow conical penetration end having virtually its entire surface provided with a plurality of longitudinally and circumferentially spaced apertures and a hollow domed laterally apertured base end integral with and in communication with the hollow interior of said penetration end and positioned in virtually perpendicular relationship with respect to the penetration end at the bottom thereof, each of said continuously multi-apertured penetration ends being cooperable for insertion upwardly into the hollow interior of a fowl at laterally spaced points, with the corresponding domed laterally apertured base ends positioned exterior of, and underneath, said fowl for automatic reception of basting liquid carried by an underlying roasting pan as a result of the boiling thereof during the roasting operation; and another hollow apertured penetration means comprising lateral self-basting liquid outlet means and including a lateral hollow apertured penetration end and an apertured exterior return-flow end in communication therewith, said apertured penetration end being cooperable for lateral insertion into the hollow interior of a fowl in interior direct communication with the plurality of multi-apertured penetration ends of said plurality of self-basting inlet means, and wtih the apertured return-flow end positioned exterior of said fowl and laterally adjacent thereto for the automatic return of basting liquid from the hollow interior of the fowl to the hollow domed laterally apertured base ends of the plurality of self-basting inlet means by means of an underlying roasting pan whereby to provide continuous effectively circulating self-basting of the interior of the fowl during the roasting operation.

References Cited in the file of this patent

UNITED STATES PATENTS

| 1,337,122 | Doak | Apr. 13, 1920 |
| 1,339,625 | Holloway | May 11, 1920 |
| 1,349,302 | Spitz | Aug. 10, 1920 |
| 2,075,407 | Schwartzman | Mar. 30, 1937 |
| 2,204,158 | Serio et al. | June 11, 1940 |
| 2,258,173 | Bratek et al. | Oct. 7, 1941 |
| 2,350,623 | Kruea | June 6, 1944 |
| 2,544,316 | Higgins | Mar. 6, 1951 |

FOREIGN PATENTS

| 185,901 | Switzerland | Nov. 2, 1936 |